(12) United States Patent
Kapinos et al.

(10) Patent No.: US 9,239,917 B2
(45) Date of Patent: Jan. 19, 2016

(54) GESTURE CONTROLLED LOGIN

(71) Applicant: Lenovo (Singapore) Pte. Ltd., Singapore (SG)

(72) Inventors: Robert James Kapinos, Durham, NC (US); Alfredo Zugasti Hays, Cary, NC (US); Axel Ramirez Flores, Cary, NC (US); Bruce Douglas Gress, Raleigh, NC (US); Jose Rodolfo Ruiz, Raleigh, NC (US)

(73) Assignee: Lenovo (Singapore) Ltd. Ptd., Singapore (SG)

( * ) Notice: Subject to any disclaimer, the term of this patent is extended or adjusted under 35 U.S.C. 154(b) by 0 days.

(21) Appl. No.: 14/094,856

(22) Filed: Dec. 3, 2013

(65) Prior Publication Data

US 2015/0154394 A1    Jun. 4, 2015

(51) Int. Cl.
*H04L 29/06* (2006.01)
*G06F 21/00* (2013.01)
*G06F 21/36* (2013.01)
*G06F 21/31* (2013.01)

(52) U.S. Cl.
CPC ............... *G06F 21/36* (2013.01); *G06F 21/31* (2013.01)

(58) Field of Classification Search
CPC ...................................................... G06F 21/36
See application file for complete search history.

(56) References Cited

U.S. PATENT DOCUMENTS 5,425,102 A * 6/1995 Moy .............................. 713/183
2013/0004016 A1* 1/2013 Karakotsios et al. ......... 382/103

* cited by examiner

*Primary Examiner* — Lisa Lewis
(74) *Attorney, Agent, or Firm* — Ference & Associates LLC

(57) ABSTRACT

An embodiment provides a method, including: activating, at an information handling device, an optical sensor; initiating, using a processor, an identification sequence; receiving, at the optical sensor, a sequence of user gesture input; determining if the sequence of user gesture input matches a predetermined sequence of user gesture input stored as training data, the determining comprising comparing, using the processor, data points derived from a three dimensional limb movement of the user gesture input with the stored training data; and providing an identification result. Other aspects are described and claimed.

19 Claims, 4 Drawing Sheets

GESTURE CONTROLLED LOGIN

BACKGROUND

Information handling devices ("devices"), for example laptop computers, tablets, smart phones, e-readers, desktop computers, etc., may be secured in various ways to restrict access to the device and/or components thereof. Traditional pass codes/passwords have been supplemented or replaced using other forms of security mechanisms, e.g., biometric login using a fingerprint reader, facial recognition using a camera, touch gesture or swipe pattern entry using a touch screen, etc. In some cases, these mechanisms are used in combination. Security mechanisms strive to achieve a balance between security, e.g., complexity of a password, and ease of use, e.g., ability of a user to remember a password.

BRIEF SUMMARY

In summary, one aspect provides a method, comprising: activating, at an information handling device, an optical sensor; initiating, using a processor, an identification sequence; receiving, at the optical sensor, a sequence of user gesture input; determining if the sequence of user gesture input matches a predetermined sequence of user gesture input stored as training data, the determining comprising comparing, using the processor, data points derived from a three dimensional limb movement of the user gesture input with the stored training data; and providing an identification result.

Another aspect provides an information handling device, comprising: an optical sensor; a processor; and a memory storing instructions that are executed by the processor to: activate, at an information handling device, an optical sensor; initiate, using a processor, an identification sequence; receive, at the optical sensor, a sequence of user gesture input; determine if the sequence of user gesture input matches a predetermined sequence of user gesture input stored as training data, the determining comprising comparing, using the processor, data points derived from a three dimensional limb movement of the user gesture input with the stored training data; and providing an identification result.

Another aspect provides a product, comprising: a device readable storage device having device readable code stored therewith, the device readable code comprising: code configured to activate, at an information handling device, an optical sensor; code configured to initiate, using a processor, an identification sequence; code configured to receive, via the optical sensor, a sequence of user gesture input; code configured to determine if the sequence of user gesture input matches a predetermined sequence of user gesture input stored as training data, the determining comprising comparing, using the processor, data points derived from a three dimensional limb movement of the user gesture input with the stored training data; and code configured to provide an identification result.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
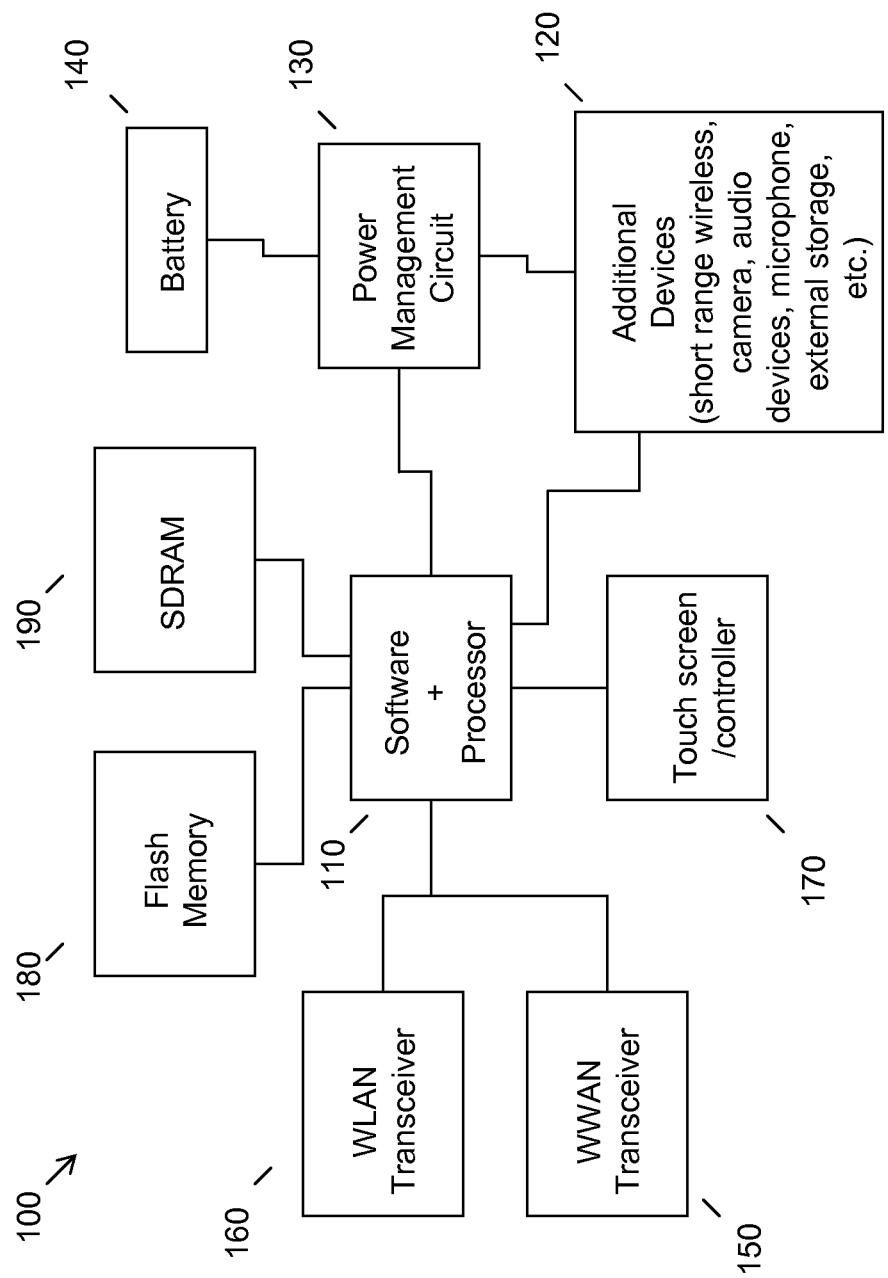
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Examples of conventional secured access mechanisms include password/pass code logins, biometric logins, and token or device based logins. Password logins, while secure, are subject to forgetfulness (e.g., user forgets the password) and lack of an indication that the entity providing the password is live, e.g., is not a software generated password. Biometric logins, e.g., facial recognition logins, are subject to impersonation, e.g., by picture, and may suffer from poor recognition accuracy. Token logins, again while quite secure, require the user to have a device (e.g., smart card) for login.

Accordingly, an embodiment leverages gesture recognition technology, e.g., a pattern of user movements in three dimensional space such as a dance sequence, patterned hand and head movements, etc., to provide a secured login sequence. Users are unique in that their particular physical makeup (e.g., limb length, hand size, head shape, coordination, movement, gait, etc.) dictates how they perform gestures. Users also have unique mannerisms, habits, postures, and action speeds that provide identity cues when performing gestures. Moreover, even for simple gestures, the particular characteristics of users tend to be reflected in how they perform gestures. This permits a plurality of unique and complex data points, e.g., corresponding to head and/or limb movements, as well as characteristics of the object itself, e.g., shape/size of head, limb, etc., to be provided by a user in an easy to remember login sequence. The data points provided by a user performing a login sequence, along with the user-physical parameters and performance uniquenesses are enough to identify not only that the login sequence is being performed but to identify the author of the sequence.

For example, an optical sensor, e.g., a camera of an information handling device that converts ambient light into a digital form using a lens focusing the light onto a filter, and a gesture recognition engine may be trained by the user to detect a specific sequence of gestures as an authentication mechanism. These gestures are unique in both content (the gross gestures used) and user style (e.g., the size of hand, shape of limb, limb acceleration, and individual defects of technique, etc.) in the gesture. Since the gesture happens at the time of login (i.e., in a real-time fashion) and from a certain vantage point (i.e., that of the camera), such a login sequence is difficult to emulate or reproduce, e.g., by another user or in data form (e.g., as a film input), ensuring both that a user is actually performing the login sequence and it is the authorized user. Since the gesture has both individual unique aspects (e.g., the style of the gesture) and mental held components (e.g., the gesture sequence known only to the authorized user) the login sequence is difficult to discern and duplicate. In addition, gesture execution is easily obfuscated by addition of unrelated sequences at the beginning or end, adding to the security of the login sequence without unnecessarily complicating the situation for the authorized user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 may be included, for example a camera for receiving gesture inputs for secure login, as further described herein. Commonly, system 100 will include a touch screen 170 for data input and display/rendering. System 100 also typically includes various memory devices, for example flash memory 180 and SDRAM 190.

Figure 2:
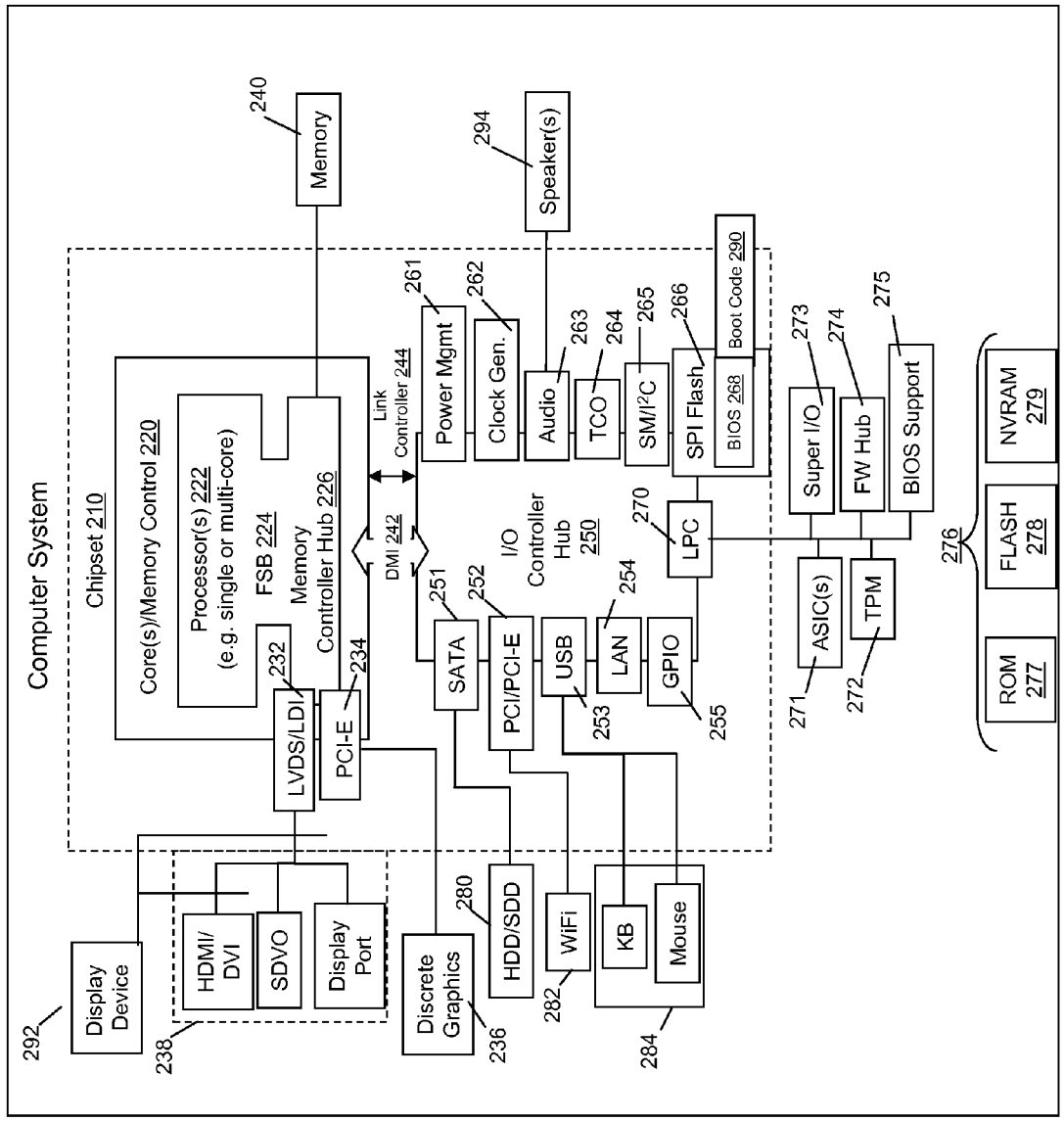
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in connection with gesture controlled logins. For example, a device having circuitry such as outlined in FIG. 1 may be used in a hand held for gesture controlled login, as further described herein. Similarly, a device including circuitry as outlined in FIG. 2 may be used in a larger device, such as a laptop or desktop computer, for use in gesture controlled logins, as further described herein.

Figure 3:
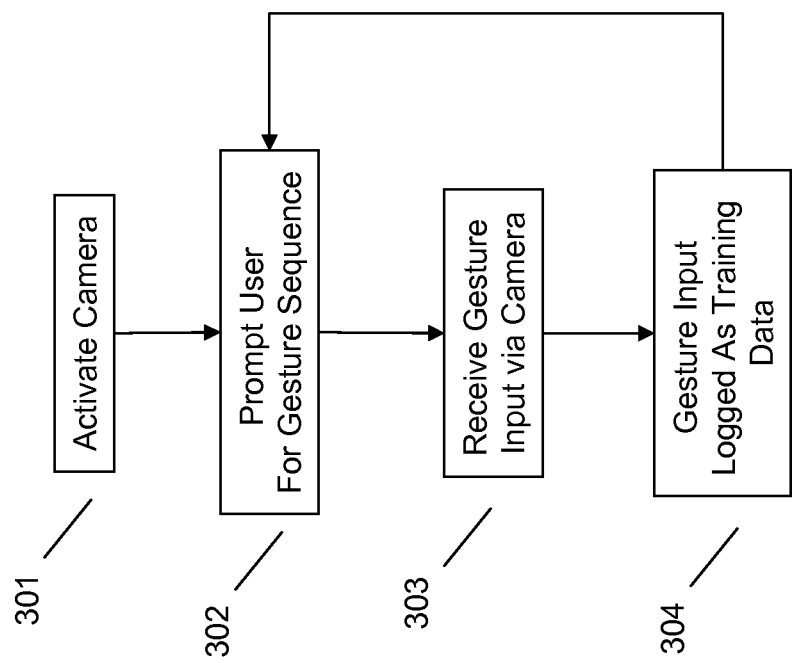
FIG. 3 illustrates an example method of enrolling a user for gesture login.

Turning to FIG. 3, an embodiment enrolls a user by collecting gesture inputs to learn or characterize the user via the gesture inputs, e.g., using a gesture recognition engine. The enrollment process may begin by activating an appropriate optical sensor at 301, e.g., a camera or cameras of an information handling device such as a hand held smart phone or an embedded camera of a laptop computer, and/or a camera operatively coupled to a device, such as a camera attached or embedded to a monitor or LCD panel of a desktop computer.

The optical sensor activated at 301 may be used to collected gesture input of the user, e.g., a sequence of user gesture input. This sequence may be predetermined, e.g., one of a set of gesture sequences predetermined by the system and/or may be a gesture sequence created by the user. It should be noted herein that by gesture input or a sequence of user gesture input it is meant that the user moves in three dimensional space to provide the gesture input in the form of image information. Thus, the gesture input or sequence of user gesture input is, for example, movement of the user's body part(s) in three dimensional space. The particular gestures or sequence thereof may be prompted by the system.

For example, at 302 an embodiment may prompt the user to provide the gesture inputs, e.g., by audibly indicating that an enrollment process has stated. As another example, an embodiment may provide a visual display or audible indication of the gesture inputs the user is to perform. Thus, a user may be instructed as to which gestures, and the sequence thereof, should be performed. This may be helpful, for example, to ensure that the user performs the gesture(s) in view of the camera and/or provides gestures that are of an appropriate complexity for both distinguishing the user as a unique individual and memorable enough and easy enough to perform that the user may faithfully reproduce them for actual login.

An example of a prompt for a sequence of user gesture input therefore may be: touch the screen, touch your nose, touch the top of your head, and touch the screen again at a different location. This may be communicated to the user in an audible and/or visual prompt. A user may therefore provide this gesture sequence at 303, e.g., as recorded or captured by the camera. Thus, in response to the prompt at 302, a user may touch the screen (using one or both hands), e.g., touching a display monitor of a desktop or laptop computer, touch his or her nose (using one or both hands), touch the top of his or her head (using one or both hands), and then touch the screen again at a different location (using one or both hands).

As will be appreciated, a large degree of variation may take place between different users performing these gestures. For example, the gross gestures themselves may be performed differently. By way of example, a left handed user may use only his or her left hand. Another user may use both hands to perform some steps, whereas yet another user may only use his or her right hand to perform all steps. Furthermore, as indicated above, because users have different physical characteristics (e.g., size, height, coordination level, etc.), these gross gestures will be performed differently by different users, even though two users may perform the exact same sequence.

Moreover, depending on the gesture recognition engine utilized, more refined data points may be collected. Thus, the gesture recognition engine may record data points indicative of both of gesture movement characteristics (grossly), but also object characteristics of the object (e.g., hand, limb, head) used to perform the sequence of user gesture input. This additional data may be used to supplement the complexity of data utilized to characterize the gesture login data recorded as training data and later used for comparison purposes during login. As will be appreciated, differing levels of data may be chosen depending on the security level required (e.g., general device login vs. secured file or application level login). Therefore, varying levels of complexity may be built into the gesture input and or gesture recognition mechanism to vary the security of the login mechanism.

For example, gross gesture characteristics such as the timing and general shape (e.g., of movement of the object in three dimensional space) of different gestures performed may be recorded for comparison of their conformance to an expected three dimensional pattern of the gestures. In some instances, this may include characteristics such as acceleration of an object performing a gesture, its trajectory or a combination thereof. To add another degree of complexity to the data analyzed, object characteristics such as the size and shape of an object (e.g., hand, head, limb, etc.) performing a gesture may be logged and used in the gestured recognition analysis.

As will be readily understood by those having ordinary skill in the art, various gesture recognition engines and techniques may be utilized. For example, the user (e.g., body part) may be used as an object that is tracked and logged as training data. Moreover, the accuracy of the gesture input (detection thereof) may be improved in various ways, e.g., having the user hold an easily recognizable object that is tracked. In this respect, the use of an object may also be used to supplement the movement data, e.g., by recording the object's orientation as it moves in three dimensional space.

Therefore, an embodiment will collect the gesture input provided by the user and process it using a gesture recognition engine (with the desired degree of complexity) to establish training data at 304. This training data may thus be used for comparison purposes during an actual login sequence, as further described herein.

Figure 4:
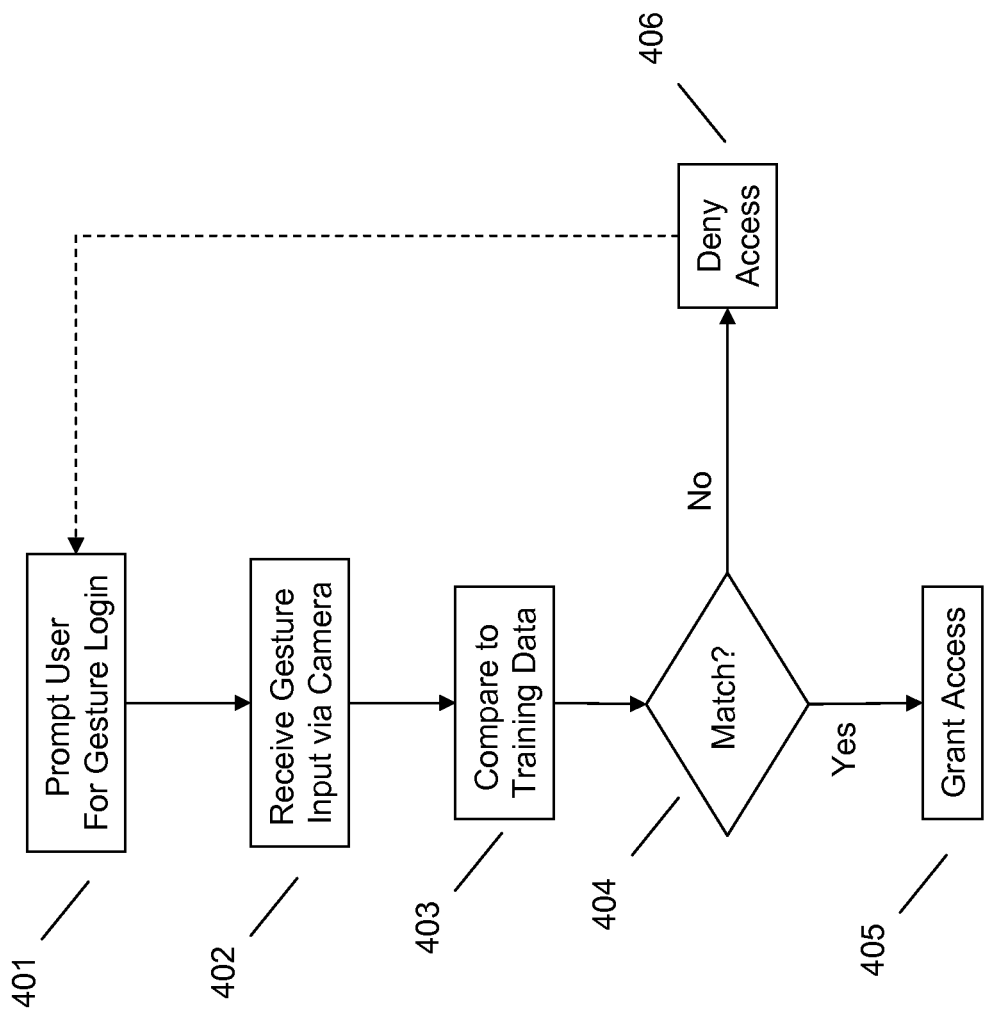
FIG. 4 illustrates an example method of gesture controlled login.

As outlined in FIG. 4, for example, after a user has successfully enrolled gesture training data sufficient for the gesture recognition engine to recognize the user's gesture login, at login time, an embodiment may prompt the user for a gesture login at 401. As with the training data (and depending on the security of the process desired) an embodiment may include in this prompt a clue, e.g., a starting point for the gesture, as part of the prompt. This again may facilitate ensuring the user performs gestures that may be received, e.g., are within the field of view of the camera.

The user therefor performs the predetermined gesture he or she has set ahead of time as the login. An embodiment collects the gesture inputs of the user at 402 and compares these to the training data, e.g., using a gesture recognition engine as described herein, at 403.

If the user's gesture inputs received at 402 match those of the training data, as determined at 404, an embodiment may grant access at 405. Otherwise, an embodiment may deny access at 406, optionally with the ability for the user to provide repeated attempts via further gesture inputs. Again, the process of iterating through may be varied depending on the level of security desired and may include various clues or indications to the user of what the problem is (e.g., gesture out of view of camera, starting point wrong, gesture performed too quickly, etc.).

Thus, an embodiment may supplement (e.g., add to) existing login schemes, or be used in place thereof, by allowing a user to provide a gesture controlled login, e.g., to a device, to an application, etc. The form factor of the device may impact the gestures suitable for the gesture controlled login. For example, hand held devices such as smart phones may be more suitable for one-handed gestures, e.g., with the user holding the hand held device at arm's length with the non-gesturing hand. Likewise, distance or scaling may be needed for other devices, e.g., desktop with monitor mounted camera, in order to account for the user standing or sitting different distances from the camera. In various embodiments, the gesture recognition techniques employed by a gesture recognition engine may account for such variability, e.g., by requiring gestures in which a body part (e.g., hand) or other object is within the field of view and may be used to scale the image information containing the gestures.

Therefore, a user may utilize the various embodiments to perform gesture controlled logins. Such login mechanisms allow the user to easily remember very unique sequences, adding to security, while nonetheless making the secured login process more accessible to user's having difficulty logging in via other means (e.g., passwords, smart cards, etc.).

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal storage devices may be utilized. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    activating, at an information handling device, an optical sensor for a gesture based login;
    initiating, using a processor, an identification sequence based on a security level for the gesture based login;
    receiving, at the optical sensor, a sequence of user gesture input;
    determining if the sequence of user gesture input matches a predetermined sequence of user gesture input stored as training data for the security level,
    the determining comprising comparing, using the processor, data points derived from a three dimensional limb acceleration of the user gesture input with the stored training data;
    responsive to a successful comparison between the user gesture input and the stored training data, providing an identification result; and
    responsive to an unsuccessful comparison between the user gesture input and the stored training data, providing a clue to the user, on the security level, for providing user gesture input for the gesture based login.

2. The method of claim 1, wherein the receiving comprises receiving a sequence of user gesture input that begins with a user gesture contacting the information handling device.

3. The method of claim 2, wherein the user gesture contacting the information handling device comprises a user gesture touching a touch screen of the information handling device.

4. The method of claim 1, wherein the comparing comprises comparing both of gesture movement characteristics of the sequence of user gesture input and object characteristics of the sequence of user gesture input to the predetermined sequence of user gesture input.

5. The method of claim 4, wherein the gesture movement characteristics comprise timing of different gestures performed within the sequence and conformance of the different gestures to an expected three dimensional pattern of the gestures.

6. The method of claim 4, wherein the object characteristics comprise size and shape of an object performing a gesture.

7. The method of claim 1, further comprising providing an indication of a sequence of user gesture input is required for identification used as a login.

8. The method of claim 7, wherein the indication is provided during collection of the training data.

9. The method of claim 1, further comprising granting login access to the information handling device based on a match between the sequence of user gesture input and the predetermined sequence of user gesture input stored as training data.

10. The method of claim 1, wherein to provide a clue further comprises providing a visual indication of an additional sequence of user gesture input.

11. An information handling device, comprising:
an optical sensor;
a processor; and
a memory storing instructions that are executed by the processor to:
activate, at an information handling device, an optical sensor for a gesture based login;
initiate, using a processor, an identification sequence based on a security level for the gesture based login;
receive, at the optical sensor, a sequence of user gesture input;
determine if the sequence of user gesture input matches a predetermined sequence of user gesture input stored as training data for the security level;
the determining comprising comparing, using the processor, data points derived from a three dimensional limb acceleration of the user gesture input with the stored training data;
responsive to a successful comparison between the user gesture input and the stored training data, provide an identification result; and
responsive to an unsuccessful comparison between the user gesture input and the stored training data, provide a clue to the user, based on the security level, for providing user gesture input for the gesture based login.

12. The information handling device of claim 11, wherein to receive comprises receiving a sequence of user gesture input that begins with a user gesture contacting the information handling device.

13. The information handling device of claim 12, wherein the user gesture contacting the information handling device comprises a user gesture touching a touch screen of the information handling device.

14. The information handling device of claim 11, wherein to compare comprises comparing both of gesture movement characteristics of the sequence of user gesture input and object characteristics of the sequence of user gesture input to the predetermined sequence of user gesture input.

15. The information handling device of claim 14, wherein the gesture movement characteristics comprise timing of different gestures performed within the sequence and conformance of the different gestures to an expected three dimensional pattern of the gestures.

16. The information handling device of claim 14, wherein the object characteristics comprise size and shape of an object performing a gesture.

17. The information handling device of claim 11, wherein the instructions are further executable by the processor to provide an indication of a sequence of user gesture input is required for identification used as a login.

18. The information handling device of claim 11, wherein the instructions are further executable by the processor to grant login access to the information handling device based on a match between the sequence of user gesture input and the predetermined sequence of user gesture input stored as training data.

19. A product, comprising:
a device readable storage device having device readable code stored therewith, the device readable code being executable by a processor and comprising:
code that activates, at an information handling device, an optical sensor for a gesture based login;
code that initiates, using a processor, an identification sequence based on a security level for the gesture based login;
code that receives, via the optical sensor, a sequence of user gesture input;
code that determines if the sequence of user gesture input matches a predetermined sequence of user gesture input stored as training data for the security level;
wherein to determine comprises comparing, using the processor, data points derived from a three dimensional limb acceleration of the user gesture input with the stored training data;
code that, responsive to a successful comparison between the user gesture input and the stored training data, provides an identification result; and
code that, responsive to an unsuccessful comparison between the user gesture input and the stored training data, provides a clue to the user, based on the security level, for providing user gesture input for the gesture based login.

\* \* \* \* \*